(12) United States Patent
You et al.

(10) Patent No.: US 12,581,402 B2
(45) Date of Patent: Mar. 17, 2026

(54) METHOD AND APPARATUS FOR CELL SELECTION, TERMINAL, NETWORK DEVICE AND STORAGE MEDIUM

(71) Applicant: GUANGDONG OPPO MOBILE TELECOMMUNICATIONS CORP., LTD., Dogguan (CN)

(72) Inventors: Xin You, Dongguan (CN); Yi Hu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 489 days.

(21) Appl. No.: 18/145,643

(22) Filed: Dec. 22, 2022

(65) Prior Publication Data

US 2023/0125129 A1     Apr. 27, 2023

Related U.S. Application Data

(63) Continuation of application No. PCT/CN2020/107151, filed on Aug. 5, 2020.

(51) Int. Cl.
H04W 48/00 (2009.01)
H04W 48/20 (2009.01)

(52) U.S. Cl.
CPC .................................. H04W 48/20 (2013.01)

(58) Field of Classification Search
CPC .................................................... H04W 48/20
See application file for complete search history.

(56) References Cited

U.S. PATENT DOCUMENTS

| 12,143,865 | B2 * | 11/2024 | Cao ......................... H04W 4/06 |
| 2009/0303891 | A1 * | 12/2009 | Lucas ............. H04W 36/00835 |
| | | | 370/252 |
| 2021/0144593 | A1 * | 5/2021 | Ahn .................. H04W 36/0016 |
| 2021/0400521 | A1 * | 12/2021 | Fiorani ................. H04W 28/10 |
| 2022/0191779 | A1 * | 6/2022 | Bergqvist .............. H04W 48/18 |
| 2024/0214889 | A1 * | 6/2024 | Jung ................. H04W 36/0085 |

FOREIGN PATENT DOCUMENTS

| CN | 101686474 A | 3/2010 |
| CN | 101998514 A | 3/2011 |
| CN | 106162770 A * | 11/2016 |

(Continued)

OTHER PUBLICATIONS

International Search Report in the international application No. PCT/CN2020/107151, mailed on Apr. 26, 2021.

(Continued)

*Primary Examiner* — Khai M Nguyen
(74) *Attorney, Agent, or Firm* — Ladas & Parry, LLP

(57) ABSTRACT

A method for cell selection, including: for each first candidate cell in a plurality of first candidate cells, a terminal determines a weight of the first candidate cell based on a first parameter of the first candidate cell, and determines a priority of the first candidate cell based on a second parameter of the first candidate cell and the weight of the first candidate cell; and the terminal determines a target cell based on priorities of the plurality of first candidate cells. A terminal, a network device and a storage medium are further provided.

20 Claims, 6 Drawing Sheets

(56) References Cited

FOREIGN PATENT DOCUMENTS

| | | | | | |
|----|----------------|-----|---------|----------------|------------|
| CN | 106973414 | A | 7/2017 | | |
| CN | 109699059 | A | 4/2019 | | |
| EP | 3537769 | B1 * | 10/2021 | ............ | H04W 72/56 |
| EP | 4171126 | A1 * | 4/2023 | ............ | H04W 36/30 |
| WO | 2017012299 | A1 | 1/2017 | | |
| WO | 2022/027330 | A1 | 2/2022 | | |

OTHER PUBLICATIONS

Written Opinion of the International Search Authority in the international application No. PCT/CN2020/107151, mailed on Apr. 26, 2021.
"3rd Generation Partnership Project;Technical Specification Group Radio Access Network;Solutions for NR to support non-terrestrial networks (NTN) (Release 16)", 3GPP TR 38.821 V16.0.0 (Dec. 2019), all pages.
Extended European Search Report in the corresponding European application No. 20948293.4, mailed on Jun. 6, 2023.

* cited by examiner

101
Network device

102
Terminal

103
Network device

104
Terminal

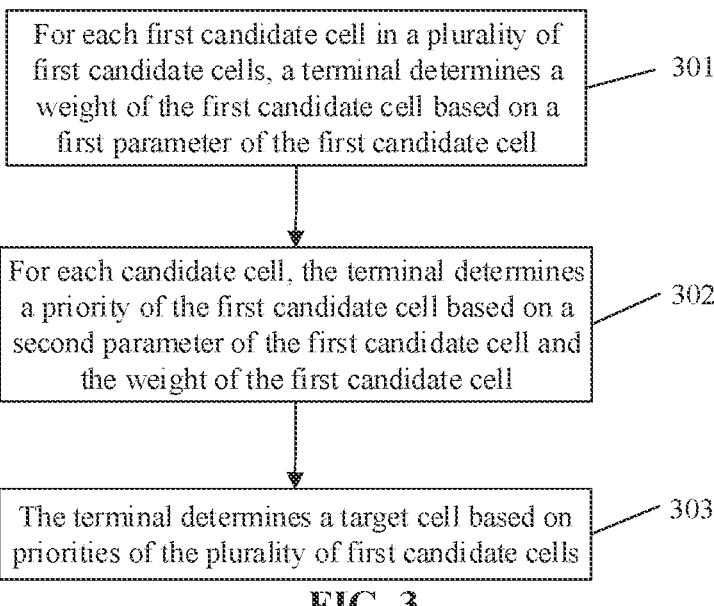

For each first candidate cell in a plurality of
first candidate cells, a terminal determines a
weight of the first candidate cell based on a
first parameter of the first candidate cell          301

For each candidate cell, the terminal determines
a priority of the first candidate cell based on a
second parameter of the first candidate cell and
the weight of the first candidate cell          302

The terminal determines a target cell based on
priorities of the plurality of first candidate cells          303

FIG. 3

METHOD AND APPARATUS FOR CELL SELECTION, TERMINAL, NETWORK DEVICE AND STORAGE MEDIUM

CROSS-REFERENCE TO RELATED APPLICATION

This application is a continuation of International Patent Application No. PCT/CN2020/107151 filed on Aug. 5, 2020, the entire contents of which are hereby incorporated herein by reference in its entirety.

BACKGROUND

The wireless network communication technology is developing more and more rapidly. At present, in a terrestrial communication system, cell selection is generally performed based on Reference Signal Received Power (RSRP), but the cell selection mechanism only based on RSRP may not guarantee the reliability of cell selection. Moreover, if the current cell selection mechanism based on RSRP is used in a non-terrestrial communication system, since the satellite is high in position from the ground, and there is no obvious difference between the RSRP corresponding to a terminal at the center of a cell and the RSRP corresponding to a terminal at the edge of the cell, performing cell selection only based on the RSRP cannot guarantee the reliability of cell selection, and even leads to ping-pong effect, which affects the user experience.

SUMMARY

The disclosure relates to the field of wireless network communication technologies. Embodiments of the disclosure provide a method for cell selection, a terminal, a network device and a non-transitory computer readable storage medium.

According to a first aspect, the embodiments of the disclosure provide a cell selection method, including the following operations.

For each first candidate cell in a plurality of first candidate cells, a terminal determines a weight of the first candidate cell based on a first parameter of the first candidate cell, and determines a priority of the first candidate cell based on a second parameter of the first candidate cell and the weight of the first candidate cell.

The terminal determines a target cell based on priorities of the plurality of first candidate cells.

According to a second aspect, the embodiments of the disclosure provide another method for cell selection, including the following operations.

A network device transmits first indication information to a terminal. Herein, the first indication information indicates type information of the first parameter and type information of the second parameter, and the first parameter and the second parameter are configured for cell selection.

According to a third aspect, the embodiments of the disclosure provide a terminal, including a processor, a receiver, a transmitter and a memory. The processor, the receiver, the transmitter and the memory are connected to each other. Herein, the memory is configured to store a computer program, and the computer program includes a program instruction. The processor is configured to call the program instruction to execute the method in the first aspect.

According to a fourth aspect, the embodiments of the disclosure provide a network device, including a processor, a receiver, a transmitter and a memory. The processor, the receiver, the transmitter and the memory are connected to each other. Herein, the memory is configured to store a computer program, and the computer program includes a program instruction. The processor is configured to call the program instruction to execute the method in the second aspect.

According to a fifth aspect, the embodiments of the disclosure provide a non-transitory computer readable storage medium. The non-transitory computer readable storage medium stores a computer program including a program instruction that, when executed by a processor, causes the processor to execute the method in the first aspect.

According to a sixth aspect, the embodiments of the disclosure provide a non-transitory computer readable storage medium. The non-transitory computer readable storage medium stores a computer program including a program instruction that, when executed by a processor, causes the processor to execute the method in the second aspect.

BRIEF DESCRIPTION OF THE DRAWINGS

In order to describe the technical solutions in the embodiments of the disclosure more clearly, the following will briefly introduce the accompanying drawings which are needed in the embodiments.

FIG. 3 is a flowchart of a method for cell selection according to an embodiment of the disclosure.

DETAILED DESCRIPTION

Figure 1A:
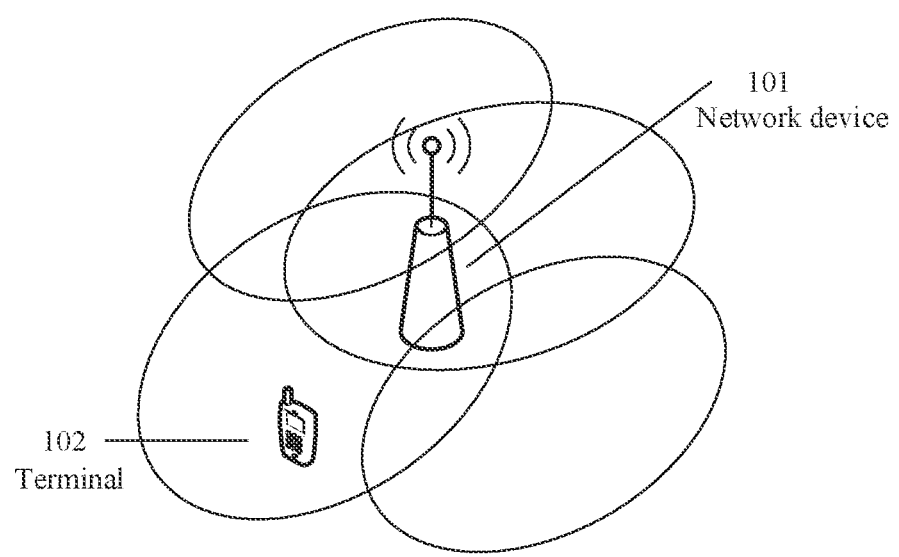
FIG. 1A is an architecture diagram of a terrestrial communication system according to an embodiment of the disclosure.

The technical solutions in the embodiments of the disclosure will be clearly described below with reference to the drawings in the embodiments of the disclosure.

In a communication system, there are often cases where a terminal performs cell selection/reselection. For example, when the terminal is powered or enters a coverage area from a blind area, the terminal may search for all frequency points allowed by the Public Land Mobile Network (PLMN), and perform cell selection to select a suitable cell to camp on. For another example, the terminal may also monitor the channel quality of a candidate cell and the current camping cell in an idle mode to perform cell reselection and select the best cell to provide a service signal. Therefore, it is ensured that the terminal selects a suitable cell to provide services through cell selection/reselection.

In some feasible implementations, the terminal, after successfully camping on the cell, may continuously perform serving cell measurement so as to determine whether to perform reselection measurement on the candidate cell(s) or not. Optionally, the terminal may calculate a Srxlev value and a Squal value based on an RSRP measurement result, and compare the Srxlev value and the Squal value with an intra-frequency measurement start threshold and an inter-frequency measurement start threshold to determine whether to perform reselection measurement on the candidate cell(s) or not. Herein, all parameters related to measurement behavior constraints of the terminal in the idle state come from a system broadcast message. In the following, it is assumed that all the related parameters are configured. If they are not configured, related constraints may not exist. Herein, whether the terminal performs reselection measurement on the candidate cell(s) may include the following three cases. In the first case, if the frequency priority of the candidate cell is higher than that of a serving cell, the terminal may always measure the candidate cell. In the second case, the frequency priority of the candidate cell is equal to or lower than that of the serving cell, and the candidate cell is an inter-frequency candidate cell. In this case, inter-frequency measurement start thresholds $S_{nonIntraSearchP}$ and $S_{nonIntraSearchQ}$ for cell reselection measurement are introduced. Specifically, when Srxlev of the serving cell is greater than $S_{nonIntraSearchP}$ and Squal of the serving cell is greater than $S_{nonIntraSearchQ}$, the terminal decides whether to measure the candidate cell by itself, otherwise, the terminal must start the measurement of the candidate cell. In the third case, the candidate cell is an intra-frequency candidate cell. In this case, intra-frequency measurement start thresholds $S_{IntrasearchP}$ and $S_{IntrasearchQ}$ for cell reselection measurement are introduced. Specifically, if Srxlev of the serving cell is greater than $S_{IntrasearchP}$ and Squal of the serving cell is greater than $S_{IntrasearchQ}$, the terminal decides whether to measure the candidate cell by itself, otherwise, the terminal must start the measurement of the candidate cell.

Herein, measurement configuration may be Synchronization Signal Block (SSB)-based measurement timing configuration per frequency configured for the intra-frequency and the inter-frequency, so as to assist the measurement of the terminal and achieve the power-saving of the terminal.

Herein, the specific expression of an S criterion is as follows.

$$Srlev>0 \text{ and } Squal>0$$

$$Srxlev=Qrelevmeas-(Qrelevmin-Qrelevminoffset)-Pcompensation$$

$$Squal=Qqualmeas-(Qqualmin+Qqualminoffset)$$

The parameters in the formula are explained as follows.

| | |
|---|---|
| Srxlev | Cell received level value |
| Squal | Cell received signal quality |
| Qrelevmeas | Cell received level value (RSRP) measured by a terminal |
| Qqualmeas | Cell received signal quality measured by a terminal |
| Qrelevmin | Minimum received level value required by a cell |
| Qqualmin | Minimum received signal quality required by a cell |
| Qrelevminoffset | Offset from Qrelevmin |
| Qqualminoffset | Offset from Qqualmin |
| Pcompensation | Max ($P_{emax} - P_{umax}$, 0) |
| $P_{emax}$ | Maximum transmit power that may be used by a terminal for uplink transmission |
| $P_{umax}$ | Maximum transmit power of a terminal |

Herein, the specific expression of an R criterion is as follows.

$$Rs=Qmeas,s+Qhyst-Qoffsettemp$$

$$Rn=Qmeas,n-Qoffset-Qoffsettemp$$

The parameters in the formula are explained as follows.

| | |
|---|---|
| Qmeas | RSRP value measured by a terminal |
| Qoffset | For the intra-frequency: equals to $Qoffset_{s,n}$ if $Qoffset_{s,n}$ is valid, otherwise this equals to 0. For the inter-frequency: equals to $Qoffset_{s,n}$ plus $Qoffset_{frequency}$ if $Qoffset_{s,n}$ is valid, otherwise this equals to $Qoffset_{frequency}$. |
| Qoffsettemp | Additional offset applied to cell reselection as specified in TS 38.331[3] |

Optionally, the abovementioned frequency priority is preconfigured by the network device, and the network device may configure the priorities of different frequency points to realize the load balance of different frequency points. The terminal may preferentially camp on a frequency point with a high priority. The priority configuration may be to use both a cell reselection priority and a sub-priority to jointly indicate the final cell reselection frequency priority. The values of the cell reselection priority are 0 to 7, and the values of the sub-priority are {0.2, 0.4, 0.6, 0.8}, indicating a total of 40 frequency priorities. Herein, the sub-priority is only used for New Radio (NR) frequency and Long Term Evolution (LTE) frequency. Herein, the terminal may obtain the information of the frequency priority from a system broadcast, or may obtain the information of the frequency priority from dedicated signaling, such as Radio Resource Control Release (RRC Release), or may inherit the information of the frequency priority from other Radio Access Technologies (RATs). Herein, the release condition of the frequency priority configuration may be triggered in the case of state transition of the terminal, or the selection of the PLMN by the terminal, or in the case that a timer expires. For the abovementioned priority, if there is special configuration, broadcast configuration is not needed. For any camping cell state, broadcast configuration is used. If no priority is configured, the priority is the lowest by default. The frequencies between RATs may not be configured with the same frequency priority.

In some feasible implementations, the terminal determines whether to perform cell reselection after determining to perform reselection measurement on a candidate cell and obtaining a measurement result of the candidate cell, which may include the following three cases. In the first case, for the candidate cell corresponding to the high frequency point priority, if the Squal value of the candidate cell is higher than a certain threshold for a specified length of time or if the Srxlev value is higher than a certain threshold for a specified length of time, and the terminal has camped on the current serving cell for more than 1 second, cell reselection is performed. In the second case, for the candidate cell corresponding to the same frequency point priority, cell reselection needs to be performed based on the R criterion. If an Rn value of the candidate cell is better than an Rs value of the serving cell for a specified length of time, cell reselection is performed. In the third case, for the candidate cell corresponding to the low frequency point priority, if the Squal value of the serving cell is lower than a certain threshold and the Squal value of the candidate cell is higher than a certain threshold for a specified length of time, or if the Srxlev value of the serving cell is lower than a certain threshold and the Srxlev value of the candidate cell is higher than a certain threshold for a specified length of time, and the terminal has camped on the current serving cell for more than 1 second, cell reselection is performed.

At present, in a terrestrial communication system, cell selection/reselection is performed based on the measurement of RSRP of the candidate cell. For example, cell selection means that when the channel quality and level of a candidate cell meet the S criterion, the terminal may access the cell to camp on. For another example, cell reselection means that when the channel quality and level of a candidate cell meet the S criterion and a certain reselection decision criterion (R criterion), the terminal may access the cell to camp on. Herein, the specific implementation of cell reselection may include as follow. The terminal may first calculate the Srxlev value and Squal value of at least one candidate cell according to the S criterion, and select the corresponding cells with the Srxlev value greater than 0 and the Squal value greater than 0 as initial candidate cells; calculate the Rn values of the initial candidate cells based on the R criterion, and take the corresponding initial candidate cells with the Rn value within a rangeToBestCell (the best cell range) as target candidate cells; and then select the cell with the maximum number of beams meeting the threshold from the target candidate cells as a target cell. It is to be seen that the S criterion and R criterion used in cell selection/reselection are both based on RSRP. If cell selection/reselection is performed only based on RSRP, the reliability of cell selection may not be guaranteed. Moreover, if the cell selection/reselection mechanism based on RSRP is applied to a non-terrestrial communication system, considering that the satellite is high in position from the ground, there is no obvious difference between the RSRP corresponding to the terminal at the center of the cell and the RSRP corresponding to the terminal at the edge of the cell, and therefore, performing cell selection/reselection only based on RSRP cannot guarantee the reliability, and may even lead to ping-pong effect, which affects the user experience. For the above problem, the disclosure provides a method for cell selection. It is to be understood that the method for cell selection proposed in the disclosure includes cell selection and cell reselection. The terminal may determine a target cell selected by the terminal from a plurality of candidate cells based on first parameters and second parameters of the candidate cells. For example, for each of the candidate cells, the terminal may determine a weight of the candidate cell based on the first parameter of the candidate cell; and determine the target cell selected by the terminal from the plurality of candidate cells based on weights of the candidate cells and the second parameters of the candidate cells. Optionally, the specific implementation of determining the target cell selected by the terminal from the plurality of candidate cells based on the weights of the candidate cells and the second parameters of the candidate cells may include as follows. For each of the candidate cells, a priority of the candidate cell is determined based on the weight of the candidate cell and the second parameter of the candidate cell; and the target cell selected by the terminal is determined based on priorities of the candidate cells. This method of determining the target cell combines a variety of parameters to screen the candidate cells, so that the terminal accesses an optimal cell, which ensures the reliability of cell selection by the terminal and avoids the ping-pong effect.

Figure 1B:
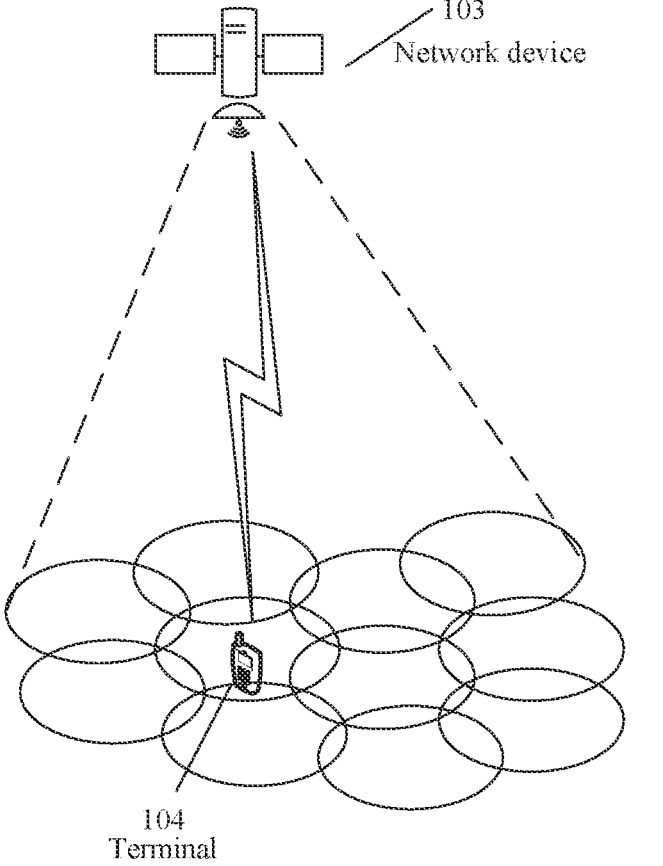
FIG. 1B is an architecture diagram of a non-terrestrial communication system according to an embodiment of the disclosure.

It is to be understood that systems to which the technical solution of the embodiments of the disclosure may be applied include a terrestrial communication system and a non-terrestrial communication system. FIG. 1A and FIG. 1B respectively illustrate an architecture diagram of a terrestrial communication system and an architecture diagram of a non-terrestrial communication system according to embodiments of the disclosure. In the description of the following embodiments, the architectures of the terrestrial communication system and the non-terrestrial communication system are explained.

Referring to FIG. 1A, FIG. 1A is an architecture diagram of a terrestrial communication system according to an embodiment of the disclosure. The terrestrial communication system may include a network device 101 and one or more terminals 102. A terminal 102 may communicate with the network device 101, and a terminal 102 and another terminal 102 may also communicate with each other.

It is to be understood that the terrestrial communication system shown in FIG. 1A is only schematic description, and the terrestrial communication system may also include other devices, such as a core network device, a wireless relay device and a wireless backhaul device, which are not shown in FIG. 1A. In the embodiment of the disclosure, no limit is made to the number of network devices and the number of terminals included in the terrestrial communication system.

Herein, the terminals 102 may be distributed throughout the communication system, and each terminal 102 may be stationary or mobile. The terminal 102 may also be referred to by those skilled in the art as a mobile station, a subscriber station, a mobile unit, a subscriber unit, a wireless unit, a remote unit, a mobile device, user equipment, a wireless device, a wireless communication device, a remote device, a mobile subscriber station, an access terminal, a mobile terminal, a wireless terminal, a remote terminal, a handheld device, a user agent, a mobile client, a client or some other appropriate terminology. The terminal 102 may be a cellular phone, a Personal Digital Assistant (PDA), a wireless modem, a wireless communication device, a handheld device, a tablet computer, a laptop computer, a cordless phone, a Wireless Local Loop (WLL) station, or the like. The terminal 102 may communicate with the network device 101 in the communication system. It is to be understood that the embodiment of the disclosure does not limit the specific technology and specific device form adopted by the terminal.

Herein, the network device 101 may provide communication coverage for its geographical area. The network device 101 may be of different types, such as a macro base station, a micro base station, a relay station and an access point. In some embodiments, a base station may be referred to by those skilled in the art as a base transceiver, a wireless base station, an access point, a wireless transceiver, a Basic Service Set (BSS), an Extended Service Set (ESS), a Node B(NodeB), an evolved Node B (eNB or eNodeB) or some other appropriate terminology. Exemplarily, in a 5G system, the base station is referred to as gNB. In a system with different RATs, the names of devices with base station functions may be different, for example, referred to as gNodeB or gNB in a 5G NR system.

Referring to FIG. 1B, FIG. 1B is an architecture diagram of a non-terrestrial communication system according to an embodiment of the disclosure. The non-terrestrial communication system generally provides a communication service to a terrestrial user by satellite communication. The non-terrestrial communication system may include a network device 103 and one or more terminals 104. A terminal 104 may communicate with the network device 103, and a terminal 104 and another terminal 104 may also communicate with each other. Herein, for understanding of the terminal 104, reference may be made to the description of the abovementioned terminal 102.

It is to be understood that the non-terrestrial communication system shown in FIG. 1B is only schematic description, and the non-terrestrial communication system may also include other devices, which are not shown in FIG. 1B. In the embodiment of the disclosure, no limit is made to the number of network devices and the number of terminals included in the non-terrestrial communication system.

Figures 2A, 2B:
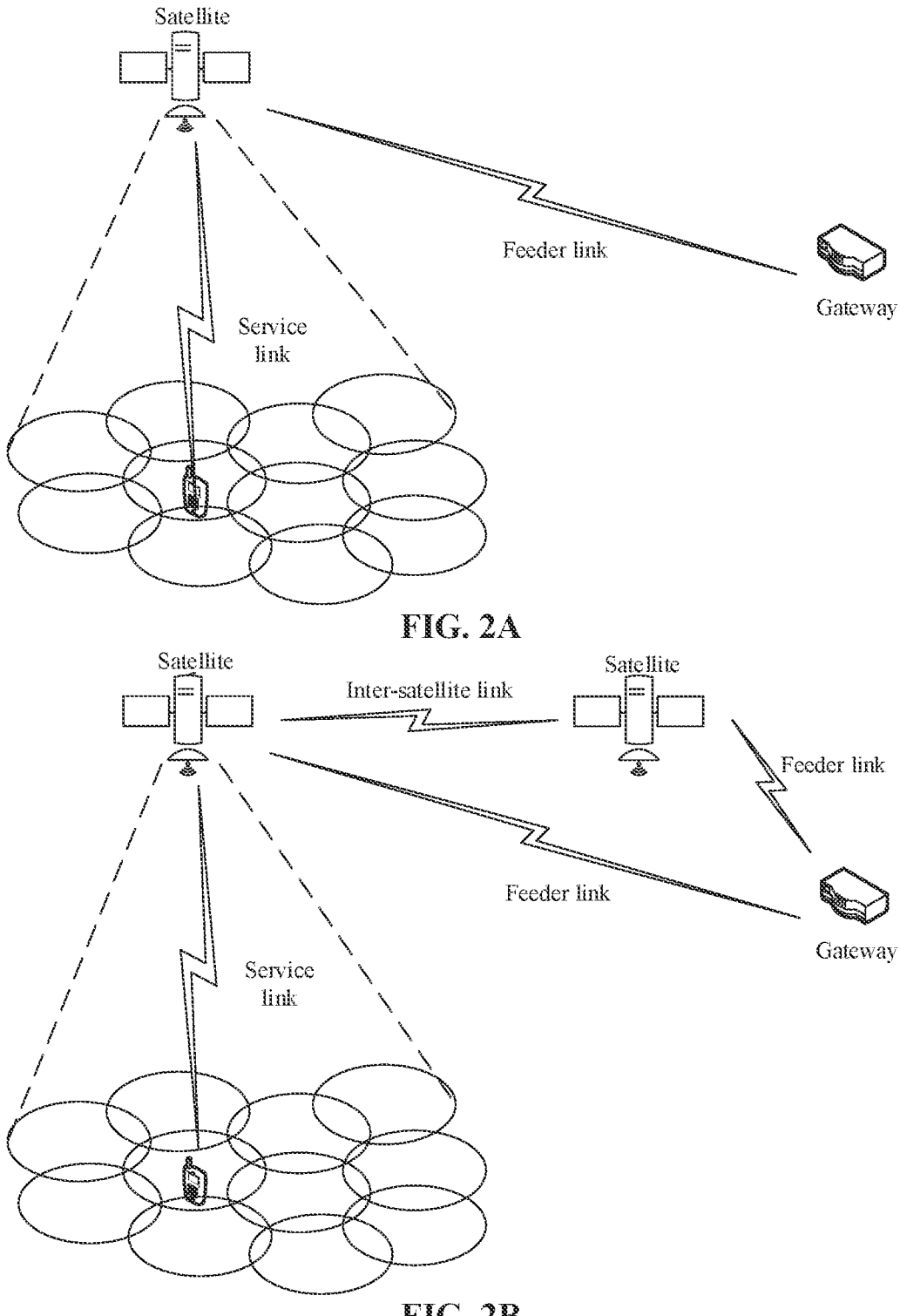
FIG. 2A is an architecture diagram of a non-terrestrial communication network scenario based on transparent payload according to an embodiment of the disclosure.
FIG. 2B is an architecture diagram of a non-terrestrial communication network scenario based on regenerative payload according to an embodiment of the disclosure.

Herein, the network device 103 may provide communication coverage for its geographical area. The network device 103 may include satellites. Exemplarily, the satellites may be classified into a Low-Earth Orbit (LEO) satellite, a Medium-Earth Orbit (MEO) satellite, a Geostationary Earth Orbit (GEO) satellite and a High Elliptical Orbit (HEO) satellite and the like according to different orbital heights of the satellites. In some embodiments, satellites may be divided into a transparent payload-based satellite and a regenerative payload-based satellite according to functions of the satellites. The transparent payload-based satellite only provides functions of wireless frequency filtering, frequency conversion and amplification, and only provides transparent forwarding of the signal without changing the waveform signal forwarded by this satellite. The regenerative payload-based satellite provides not only functions of wireless frequency filtering, frequency conversion and amplification but also functions of demodulation/decoding, routing/conversion, encoding/modulation. The regenerative payload-based satellite has part or all functions of the base station. Exemplarily, based on the functions of the satellites, deployment scenarios of the satellites may include a non-terrestrial communication network scenario based on transparent payload and a non-terrestrial communication network scenario based on regenerative payload. FIG. 2A and FIG. 2B respectively represent an architecture diagram of a non-terrestrial communication network scenario based on transparent payload and an architecture diagram of a non-terrestrial communication network scenario based on regenerative payload. Optionally, the non-terrestrial communication network may include one or more gateways, a feeder link, a service link, a satellite and an inter-satellite link. Herein, the one or more gateways are configured to connect the satellite to a terrestrial public network. The feeder link is a link for communication between the gateway and the satellite. The service link is a link for communication between the terminal and the satellite. The inter-satellite link exists in the regenerative payload-based satellite scenario. For convenience of description, in the embodiments of the disclosure, the abovementioned devices that provide the terminal 104 with non-terrestrial communication functions are collectively referred to as the network devices In the disclosure, the network device may provide communication coverage for a specific geographical area and performs terrestrial communication or non-terrestrial communication with a terminal located in the coverage area (cell). Herein, the network device provides services for the cell, and the terminal performs terrestrial communication or non-terrestrial communication with the network device through a transmission resource (for example, frequency resource) used by the cell.

In the following description of the embodiments of the disclosure, the description is made with the non-terrestrial communication scenario in which the terminal 104 performs cell selection as an example.

The embodiments of the disclosure provide a method for cell selection and a related device, which ensures the reliability of cell selection by the terminal and avoids ping-pong effect. Detailed descriptions are respectively made below.

Referring to FIG. 3, FIG. 3 is a flowchart of a method for cell selection according to an embodiment of the disclosure. The method of the embodiment is applied to the abovementioned non-terrestrial communication system, and includes the following operations 301 to 303.

At 301, for each first candidate cell in a plurality of first candidate cells, a terminal determines a weight of the first candidate cell based on a first parameter of the first candidate cell.

Herein, the plurality of first candidate cells may be determined before the operation 301 and the plurality of first candidate cells may be neighbor cells of a current serving cell of the terminal, or may also be determined in other manners.

Herein, the first parameter may be any one or more of: channel quality of the cell, location information of the terminal, a type of a satellite covering a communication range of the cell, a deployment scenario of the satellite covering the communication range of the cell, a type of the cell and a number of beams meeting a preset threshold in the cell.

Optionally, the channel quality of the cell may include signal quality of the cell or RSRP of the cell. Herein, the RSRP of the cell may specifically be the S criterion and the R criterion used in cell selection/reselection.

Herein, the channel quality of the cell may be determined based on signal quality of multiple beams in the cell. The specific implementation may include as follows. A parameter N and threshold for each frequency are broadcast by the system, the signal quality of the best N beams meeting the threshold is linearly averaged, and a linear averaging result is determined as the channel quality of the cell. If the parameter N and threshold for each frequency are not broadcast, the signal quality of the best beam in the cell is determined as the channel quality of the cell.

Optionally, the location information of the terminal may be represented based on a distance, or may also be represented based on other manners, such as round-trip delay, propagation delay, cell identifier, SSB index, satellite beam index and partial bandwidth identifier, and/or the like, which are not limited in the disclosure.

For example, in one possible implementation, the location information of the terminal is represented based on the distance. For example, the location information of the terminal may be represented based on the distance between the terminal and the satellite. The location information of the terminal may also be represented based on the distance between the terminal and a cell reference point. Herein, the cell reference point may be the cell center or a known cell location.

Optionally, in the case that the location information of the terminal is determined based on the distance, the terminal may have a positioning capability, so that the terminal performs distance measurement subsequently. Optionally, the positioning capability of the terminal may be obtained by a pre-installed Global Positioning System (GPS) chip in the terminal, or may be obtained by a pre-installed BeiDou Navigation Satellite System (BDS) chip, or may also be obtained by other positioning systems, which are not described here. Generally, a satellite positioning chip in the terminal, such as the BDS chip, is independent of a communication processor chip that realizes wireless communication network access. Even if the terminal does not access the wireless communication network, the current location information of the terminal may be obtained through the satellite positioning chip.

Optionally, the type of the satellite covering the communication range of the cell may include an LEO satellite and a GEO satellite, and/or may include other types of satellites or aircrafts, which are not limited in the disclosure.

Optionally, the deployment scenario of the satellite covering the communication range of the cell may include a non-terrestrial communication network scenario based on transparent payload and a non-terrestrial communication network scenario based on regenerative payload, and/or may include other deployment scenarios, which are not limited in the disclosure.

Optionally, the type of the cell may include a fixed cell (cell coverage of a satellite on the ground is fixed and does not change with the movement of the satellite) and a moving cell (cell coverage of a satellite changes with the movement of the satellite), and/or may also include other types of cells, which are not limited in the disclosure.

In some feasible implementations, the terminal may determine the first parameter used by the terminal for cell selection/reselection based on first indication information, and the terminal may also obtain correspondences between first parameters and weights. After obtaining the correspondences, for each first candidate cell, the terminal may determine the weight of the first candidate cell based on the first parameter of the first candidate cell and the correspondences.

It is to be noted that the above-mentioned first parameter may refer to a numerical value, such as the channel quality of the cell, the location information (represented based on the distance) of the terminal and the number of beams meeting the preset threshold in the cell. The first parameter may also refer to a type, such as the type of the satellite covering the communication range of the cell and the type of the cell. The first parameter may also refer to a scenario, such as the deployment scenario of satellites covering the communication range of the cell. The same understanding shall be made for second parameter(s) in the following description.

Herein, the first indication information indicates type information of the first parameter and the type information of the first parameter instructs the terminal to determine the first parameter. Optionally, the first indication information may be a numeric number, a bit value (bit), or other indication information, which is not limited in the disclosure. Optionally, the type information of the first parameter may be a numeric number, a bit value, or other information, which is not limited in the disclosure.

Exemplarily, if the type information of the first parameter obtained by the terminal is 1, the terminal may determine that the type information of the first parameter is the channel quality of the cell based on the indication, and after determining that the type information of the first parameter is the channel quality of the cell, the terminal may further determine that the first parameter, that is, the channel quality of the first candidate cell, is S0. For another example, if the type information of the first parameter obtained by the terminal is 2, the terminal may determine that the type information of the first parameter is the location information of the terminal based on the indication, and after determining that the type information of the first parameter is the location information of the terminal, the terminal may further determine that the first parameter, that is, the location information of the terminal (the distance between the terminal and the center of the first candidate cell), is D0. For another example, if the type information of the first parameter obtained by the terminal is 3, the terminal may determine that the type information of the first parameter is the type of the satellite covering the communication range of the cell based on the indication, and after determining that the type information of the first parameter is the type of the satellite covering the communication range of the cell, the terminal may further determine that the first parameter, that is, the type of the satellite covering the communication range of the first candidate cell, is an LEO satellite. For another example, if the type information of the first parameter obtained by the terminal is 4, the terminal may determine that the type information of the first parameter is the deployment scenario of the satellite covering the communication range of the cell based on the indication, and after determining that the type information of the first parameter is the deployment scenario of the satellite covering the communication range of the cell, the terminal may further determine that the first parameter, that is, the deployment scenario of the satellite covering the communication range of the first candidate cell, is a non-terrestrial communication network scenario based on transparent payload. For another example, if the type information of the first parameter obtained by the terminal is 5, the terminal may determine that the type information of the first parameter is the type of the cell based on the indication, and after determining that the type information of the first parameter is the type of the cell, the terminal may further determine that the first parameter, that is, the type of the first candidate cell, is a moving cell. For another example, if the type information of the first parameter obtained by the terminal is 6, the terminal may determine that the type information of the first parameter is the number of beams meeting the preset threshold in the cell based on the indication, and after determining that the type information of the first parameter is the number of beams meeting the preset threshold in the cell, the terminal may further determine that the first parameter, that is, the number of beams meeting the preset threshold in the first candidate cell, is 15.

Exemplarily, the type information of the first parameter is the channel quality of the cell, and the first parameter determined by the terminal based on the indication, that is, the channel quality of the first candidate cell, is S0. For another example, the type information of the first parameter is the location information of the terminal, and the first parameter determined by the terminal based on the indication, that is, the location information of the terminal (the distance between the terminal and the center of the first candidate cell), is D0. For another example, the type information of the first parameter is the type of the satellite covering the communication range of the cell, and the first parameter determined by the terminal based on the indication, that is, the type of the satellite covering the communication range of the first candidate cell, is the LEO satellite. For another example, the type information of the first parameter is the deployment scenario of the satellite covering the communication range of the cell, and the deployment scenario of the satellite covering the communication range of the first candidate cell, which is determined by the terminal based on the indication, is the non-terrestrial communication network scenario based on transparent payload. For another example, the type information of the first parameter is the type of the cell, and the first parameter determined by the terminal based on the indication, that is, the type of the first candidate cell, is the moving cell. For another example, the type information of the first parameter is the number of beams meeting the preset threshold in the cell, and the first parameter determined by the terminal based on the indication, that is, the number of beams meeting the preset threshold in the first candidate cell, is 15.

Optionally, the first indication information may be pre-configured, such as specified by a communication protocol. Optionally, the first indication information may be obtained by receiving a message including the first indication information from a network device. Specifically, the first indication information may be obtained by receiving a system broadcast message from the network device.

Herein, the correspondences between the first parameters and the weights may be pre-configured, such as specified by a communication protocol. Optionally, the correspondences may be obtained by receiving a message including the correspondences from the network device. Specifically, the correspondences may be obtained by receiving a system broadcast message from the network device.

Exemplarily, the type information of the first parameter instructs the terminal to determine the channel quality of the cell. After obtaining the first indication information, for each of at least one first candidate cell, the terminal determines the weight corresponding to the first candidate cell based on the determined channel quality of the first candidate cell. It is assumed that there are four first candidate cells, which are represented as a cell 1, a cell 2, a cell 3 and a cell 4, respectively. The channel quality of the cell 1, the cell 2, the cell 3 and the cell 4 are S1, S2, S3 and S4, respectively. The terminal may also obtain the correspondences between the channel quality of the cells and the weights of the cells as shown in Table 1. It is to be seen from the table that the better the channel quality of the cell is, the higher the weight of the cell is. Herein, S1 is between A1 and A2, S2 is between 0 and A1, S3 is between 0 and A1, and S4 is above A2, and the weights of these four first candidate cells are determined to be 0.5, 0.25, 0.25, and 0.75 respectively based on the channel quality corresponding to the cell 1, the cell 2, the cell 3, and the cell 4.

TABLE 1

| Channel quality of cell | Weight |
| --- | --- |
| 0-A1 | 0.25 |
| A1-A2 | 0.5 |
| Above A2 | 0.75 |

Exemplarily, the type information of the first parameter instructs the terminal to determine the location information of the terminal. Herein, the location information of the terminal may be determined based on a distance between the terminal and a reference point (cell center). After obtaining the first indication information, for each of at least one first candidate cell, the terminal determines the weight corresponding to the first candidate cell based on the 'distance from the reference point' corresponding to the first candidate cell. It is assumed that there are four first candidate cells, which are represented as a cell 1, a cell 2, a cell 3 and a cell 4, respectively. The 'distances from the reference points (cell centers)' corresponding to the cell 1, the cell 2, the cell 3 and the cell 4 are D1, D2, D3 and D4, respectively. The terminal may also obtain the correspondences between the distances between the terminal and the reference points (cell centers) and the weights as shown in Table 2. It is to be seen from the table that the closer the terminal is to the reference point, the higher the weight of the cell is. Herein, D1 is between 500 m and 1000 m, D2 is between 100 m and 500 m, D3 is between 100 m and 500 m, and D4 is above 1000 m, and based on the 'distances from the reference points (cell centers)' corresponding to the cell 1, the cell 2, the cell 3 and the cell 4, the weights of these four first candidate cells are determined to be 0.5, 0.75, 0.75, and 0.25, respectively.

TABLE 2

| Distance between the terminal and the reference point (cell center) | Weight |
| --- | --- |
| 100m-500m | 0.75 |
| 500m-1000m | 0.5 |
| Above 1000m | 0.25 |

Exemplarily, the type information of the first parameter instructs the terminal to determine the type of the satellite covering the communication range of the cell. After obtaining the first indication information, for each of at least one first candidate cell, the terminal determines the weight corresponding to the first candidate cell based on the determined type of the satellite covering the first candidate cell. It is assumed that there are four first candidate cells, which are represented as a cell 1, a cell 2, a cell 3 and a cell 4, respectively. The types of satellites corresponding to the cell 1, the cell 2, the cell 3 and the cell 4 are a GEO satellite, an LEO satellite, an LEO satellite and a GEO satellite, respectively. The terminal may also obtain the correspondences between the types of the satellites covering the communication ranges of the cells and the weights as shown in Table 3. Based on the types of satellites corresponding to the cell 1, the cell 2, the cell 3 and the cell 4, the weights of these four first candidate cells are determined to be 0.75, 0.25, 0.25 and 0.75, respectively.

TABLE 3

| Type of satellite covering the communication range of cell | Weight |
| --- | --- |
| LEO satellite | 0.25 |
| GEO satellite | 0.75 |

Exemplarily, the type information of the first parameter instructs the terminal to determine the deployment scenario of the satellite covering the communication range of the cell. After obtaining the first indication information, for each of at least one first candidate cell, the terminal determines the weight corresponding to the first candidate cell based on the determined deployment scenario of the satellite covering the first candidate cell. It is assumed that there are four first candidate cells, which are represented as a cell 1, a cell 2, a cell 3 and a cell 4, respectively. The deployment scenarios of satellites corresponding to the cell 1, the cell 2, the cell 3 and the cell 4 are a non-terrestrial communication network scenario based on transparent payload, a non-terrestrial communication network scenario based on regenerative payload, a non-terrestrial communication network scenario based on transparent payload and a non-terrestrial communication network scenario based on regenerative payload, respectively. The terminal may also obtain the correspondences between the deployment scenarios of the satellites covering the communication ranges of the cells and the weights as shown in Table 4. Based on the deployment scenarios of the satellites corresponding to the cell 1, the cell 2, the cell 3 and the cell 4, the weights of these four first candidate cells are determined to be 0.4, 0.6, 0.4 and 0.6, respectively.

TABLE 4

| Deployment scenario of satellite covering the communication range of cell | Weight |
|---|---|
| Non-terrestrial communication network scenario based on transparent payload | 0.4 |
| Non-terrestrial communication network scenario based on regenerative payload | 0.6 |

Exemplarily, the type information of the first parameter instructs the terminal to determine the type of the cell. After obtaining the first indication information, for each of at least one first candidate cell, the terminal determines the weight corresponding to the first candidate cell based on the determined type of the first candidate cell. It is assumed that there are four first candidate cells, which are represented as a cell 1, a cell 2, a cell 3 and a cell 4, respectively. The types of the cell 1, the cell 2, the cell 3 and the cell 4 are a moving cell, a fixed cell, a fixed cell and a moving cell, respectively. The terminal may also obtain the correspondences between the types of cells and the weights as shown in Table 5. Based on the types of the cells corresponding to the cell 1, the cell 2, the cell 3 and the cell 4, the weights of these four first candidate cells are determined to be 0.4, 0.6, 0.6 and 0.4, respectively.

TABLE 5

| Type of cell | Weight |
|---|---|
| Fixed cell | 0.6 |
| Moving cell | 0.4 |

Exemplarily, the type information of the first parameter instructs the terminal to determine the number of beams meeting the preset threshold in the cell. After obtaining the first indication information, for each of at least one first candidate cell, the terminal determines the weight corresponding to the first candidate cell based on the number of beams meeting the preset threshold in the first candidate cell. It is assumed that there are four first candidate cells, which are represented as a cell 1, a cell 2, a cell 3 and a cell 4, respectively. The numbers of beams meeting the preset threshold corresponding to the cell 1, the cell 2, the cell 3 and the cell 4 are M1, M2, M3 and M4, respectively. The terminal may also obtain the correspondences between the numbers of beams meeting the preset threshold in the cells and weights as shown in Table 6. Herein, M1 is between B1-B2, M2 is between 0-B1, M3 is between 0-B1 and M4 is above B2, and based on the numbers of beams meeting the preset threshold corresponding to the cell 1, the cell 2, the cell 3 and the cell 4, the weights of these four first candidate cells are determined to be 0.5, 0.25, 0.25 and 0.75, respectively.

TABLE 6

| The number of beams meeting the preset threshold in the cell | Weight |
|---|---|
| 0-B1 | 0.25 |
| B1-B2 | 0.5 |
| Above A2 | 0.75 |

At 302, for each first candidate cell, the terminal determines a priority of the first candidate cell based on a second parameter of the first candidate cell and the weight of the first candidate cell.

Optionally, the second parameter may be any one or more of: the channel quality of the cell, the location information of the terminal, the type of the satellite covering the communication range of the cell, the deployment scenario of the satellite covering the communication range of the cell, the type of the cell and the number of beams meeting the preset threshold in the cell.

Optionally, the priority may be represented by numerical values 1, 2, 3 . . . . The smaller the numerical value is, the higher the priority is, with 1 representing a first priority, 2 representing a second priority, and so on. The priority may also be represented in other manners, which are not limited in the disclosure.

In some feasible implementations, for each of the first candidate cells, the terminal may multiply the second parameter of the first candidate cell and the weight of the first candidate cell, and sort the multiplication results for the candidate cells in size, so that the terminal determines the priority of each first candidate cell based on the size relationship. Optionally, the greater the multiplication result is, the higher the priority of the first candidate cell is.

Exemplarily, the first parameter being the channel quality of the cell and the second parameter being the location information of the terminal are taken as an example, where the location information of the terminal is determined based on the distance between the terminal and the reference point (cell center). It is assumed that there are four first candidate cells, which are a cell 1, a cell 2, a cell 3 and a cell 4, respectively. The 'distances between the terminal and the reference points (cell centers)' corresponding to the cell 1, the cell 2, the cell 3 and the cell 4 are D1, D2, D3 and D4, respectively. Herein, $D1>D2>D3>D4$. It is assumed that the weights of the cell 1, the cell 2, the cell 3 and the cell 4, which are determined based on the channel quality of the respective cells, are 0.5, 0.75, 0.75 and 0.25, respectively. Then, 'the distances between the terminal and the reference points (cell centers)' corresponding to the cell 1, the cell 2, the cell 3 and the cell 4 are multiplied by the weights corresponding to the cell 1, the cell 2, the cell 3 and the cell 4, respectively, so that $0.75*D2>0.5*D1>0.25*D4>0.75*D3$ may be obtained. According to the size sorting of the multiplication results, it may be determined that new cell sorting is the cell 2, the cell 1, the cell 4 and the cell 3, and then the terminal selects the cell 2 as the target cell for cell selection/reselection.

Exemplarily, the first parameter being the location information of the terminal and the second parameter being the channel quality of the cell are taken as an example, where the location information of the terminal is determined based on the distance between the terminal and the reference point (cell center). It is assumed that there are four first candidate cells, which are a cell 1, a cell 2, a cell 3 and a cell 4, respectively. The channel quality of the cells corresponding to the cell 1, the cell 2, the cell 3 and the cell 4 is S1, S2, S3 and S4, respectively, and $S1>S2>S3>S4$. It is assumed that the weights of the cell 1, the cell 2, the cell 3 and the cell 4, which are determined based on the distances between the terminal and the reference points (cell centers), are 0.5, 0.25, 0.25 and 0.75, respectively. Then, the channel quality of the cells corresponding to the cell 1, the cell 2, the cell 3 and the cell 4 are multiplied by the weights corresponding to the cell 1, the cell 2, the cell 3 and the cell 4, respectively, so that $0.5*S1>0.25*S2>0.75*S4>0.25*S3$ may be obtained. According to the size sorting of the multiplication results, it may be determined that new cell sorting is the cell 1, the cell 2, the cell 4 and the cell 3, and then the terminal selects the cell 1 as the target cell for cell selection/reselection.

Exemplarily, the first parameter being the type of the cell and the second parameter being the channel quality of the cell are taken as an example. It is assumed that there are four first candidate cells, which are a cell 1, a cell 2, a cell 3 and a cell 4, respectively. The channel quality of the cells corresponding to the cell 1, the cell 2, the cell 3 and the cell 4 is S1, S2, S3 and S4, respectively, and S1>S2>S3>S4. It is assumed that the weights of the cell 1, the cell 2, the cell 3 and the cell 4, which are determined based on the types of the respective cells, are 0.4, 0.6, 0.6 and 0.4, respectively. Then, the channel quality of the cells corresponding to the cell 1, the cell 2, the cell 3 and the cell 4 are multiplied by the weights corresponding to the cell 1, the cell 2, the cell 3 and the cell 4, respectively, so that 0.6*S2>0.4*S1>0.6*S3>0.4*S4 may be obtained. According to the size sorting of the multiplication results, it may be determined that new cell sorting is the cell 2, the cell 1, the cell 3 and the cell 4, and then the terminal selects the cell 2 as the target cell for cell selection/reselection.

In some feasible implementations, the terminal may determine the second parameter of each first candidate cell based on the first indication information. That is, the first indication information may indicate the type information of the first parameter and may also indicate type information of the second parameter, so that the terminal may determine the second parameter of each first candidate cell based on the first indication information.

Herein, the type information of the second parameter instructs the terminal to determine the second parameter. Optionally, the type information of the second parameter may be a numeric number, a bit value, or other information, which is not limited in the disclosure.

Exemplarily, if the type information of the second parameter obtained by the terminal is 7, the terminal may determine that the type information of the second parameter is the channel quality of the cell based on the indication, and after determining that the type information of the second parameter is the channel quality of the cell, the terminal may further determine that the second parameter, that is, the channel quality of the first candidate cell, is S0. For another example, if the type information of the second parameter obtained by the terminal is 8, the terminal may determine that the type information of the second parameter is the location information of the terminal based on the indication, and after determining that the type information of the second parameter is the location information of the terminal, the terminal may further determine that the second parameter, that is, the location information of the terminal (the distance between the terminal and the center of the first candidate cell), is D0. For another example, if the type information of the second parameter obtained by the terminal is 9, the terminal may determine that the type information of the second parameter is the type of the satellite covering the communication range of the cell based on the indication, and after determining that the type information of the second parameter is the type of the satellite covering the communication range of the cell, the terminal may further determine that the second parameter, that is, the type of the satellite covering the communication range of the first candidate cell, is an LEO satellite. For another example, if the type information of the second parameter obtained by the terminal is 10, the terminal may determine that the type information of the second parameter is the deployment scenario of the satellite covering the communication range of the cell based on the indication, and after determining that the type information of the second parameter is the deployment scenario of the satellite covering the communication range of the cell, the terminal may further determine that the second parameter, that is, the deployment scenario of the satellite covering the communication range of the first candidate cell, is a non-terrestrial communication network scenario based on transparent payload. For another example, if the type information of the second parameter obtained by the terminal is 11, the terminal may determine that the type information of the second parameter is the type of the cell based on the indication, and after determining that the type information of the second parameter is the type of the cell, the terminal may further determine that the second parameter, that is, the type of the first candidate cell, is a moving cell. For another example, if the type information of the second parameter obtained by the terminal is 12, the terminal may determine that the type information of the second parameter is the number of beams meeting the preset threshold in the cell based on the indication, and after determining that the type information of the second parameter is the number of beams meeting the preset threshold in the cell, the terminal may further determine that the second parameter, that is, the number of beams meeting the preset threshold in the first candidate cell, is 15.

Exemplarily, the type information of the second parameter is the channel quality of the cell, and the second parameter determined by the terminal based on the indication, that is, the channel quality of the first candidate cell, is S0. For another example, the type information of the second parameter is the location information of the terminal, and the second parameter determined by the terminal based on the indication, that is, the location information of the terminal (the distance between the terminal and the center of the first candidate cell), is D0. For another example, the type information of the second parameter is the type of the satellite covering the communication range of the cell, and the second parameter determined by the terminal based on the indication, that is, the type of the satellite covering the communication range of the first candidate cell, is the LEO satellite. For another example, the type information of the second parameter is the deployment scenario of the satellite covering the communication range of the cell, and the second parameter determined by the terminal based on the indication, that is, the deployment scenario of the satellite covering the communication range of the first candidate cell, is the non-terrestrial communication network scenario based on transparent payload. For another example, the type information of the second parameter is the type of the cell, and the second parameter determined by the terminal based on the indication, that is, the type of the first candidate cell, is the moving cell. For another example, the type information of the second parameter is the number of beams meeting the preset threshold in the cell, and the second parameter determined by the terminal based on the indication, that is, the number of beams meeting the preset threshold in the first candidate cell, is 15.

At 303, the terminal determines a target cell based on priorities of the plurality of first candidate cells.

Herein, the target cell is a cell determined by the terminal from the plurality of first candidate cells, and the cell is the cell for cell selection/reselection by the terminal.

Specifically, the terminal may take the first candidate cell with the first priority among the plurality of first candidate cells as the target cell.

In some feasible implementations, after the terminal takes the first candidate cell with the first priority as the target cell for cell selection/reselection, the terminal may access the target cell. If the terminal cannot successfully access the target cell, the terminal may take the first candidate cell with the second priority as the target cell.

In the embodiment of the disclosure, for each first candidate cell in the plurality of first candidate cells, the terminal may determine the weight of the first candidate cell based on the first parameter of the first candidate cell, and determine the priority of the first candidate cell based on the second parameter of the first candidate cell and the weight of the first candidate cell. Furthermore, the terminal may determine the target cell based on the priorities of the plurality of first candidate cells. Therefore, the terminal screens the candidate cells according to the type information of various parameters, so that the terminal accesses the optimal cell, thus ensuring the reliability of cell selection by the terminal and avoiding the ping-pong effect.

Figure 4:
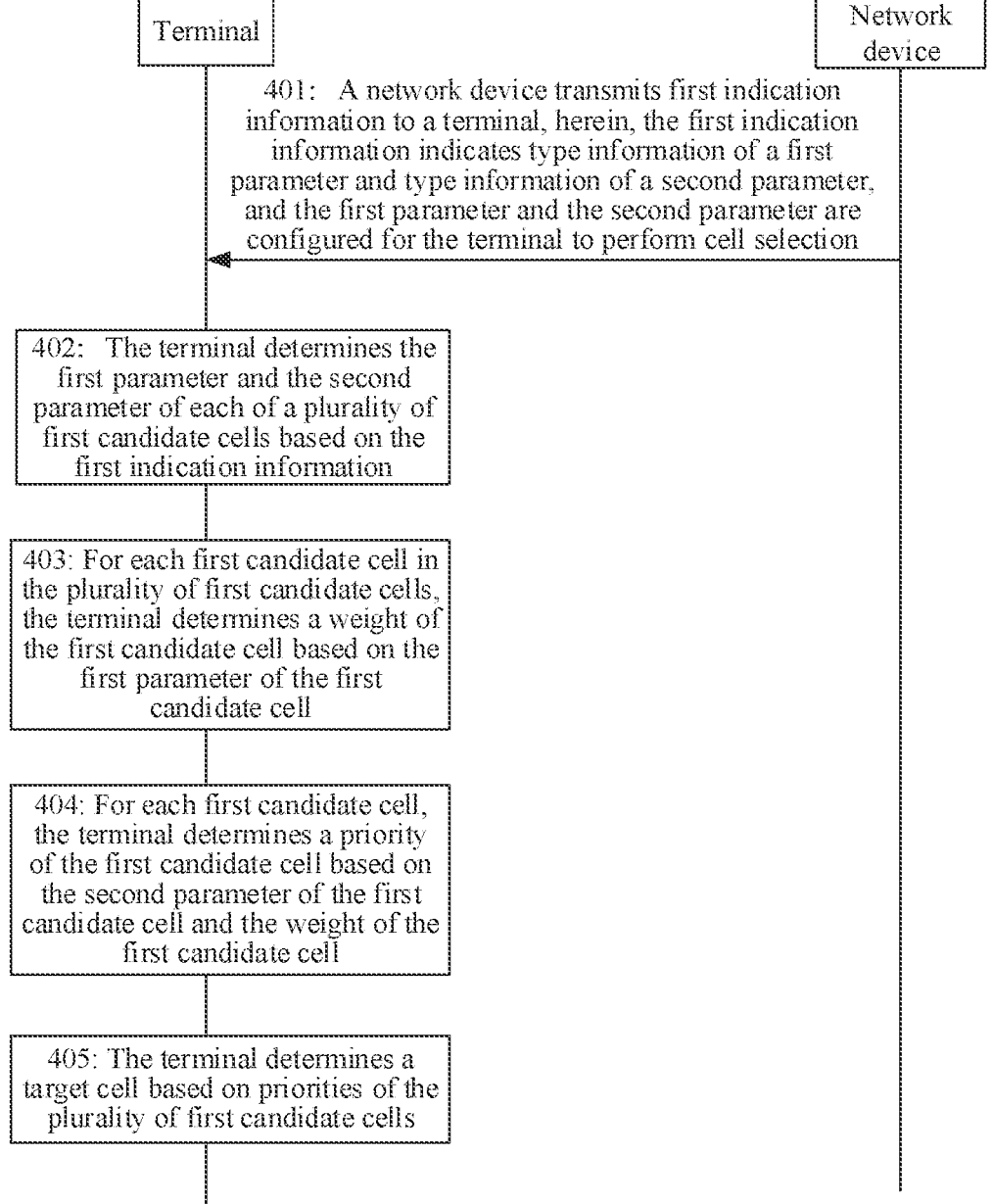
FIG. 4 is a flowchart of another method for cell selection according to an embodiment of the disclosure.

Referring to FIG. 4, FIG. 4 is a flowchart of another method for cell selection according to an embodiment of the disclosure. The method of the embodiment is applied to the above-mentioned non-terrestrial communication system, and includes the following operations 401 to 405.

At 401, a network device transmits first indication information to a terminal. Herein, the first indication information indicates type information of a first parameter and type information of a second parameter, and the first parameter and the second parameter are configured for the terminal to perform cell selection.

In some feasible implementations, the network device may transmit a first system message including the first indication information to the terminal.

Optionally, each of the first parameter and the second parameter may be at least one of: channel quality of a cell, location information of the terminal, a type of a satellite covering a communication range of the cell, a deployment scenario of the satellite covering the communication range of the cell, a type of the cell or a number of beams meeting a preset threshold in the cell.

It is to be noted that the first parameter and the second parameter may each include one or more types of parameters, but the first parameter and the second parameter are different parameters. The type information of the first parameter and the type information of the second parameter may instruct the terminal to determine the first parameter and the second parameter, respectively. Optionally, the type information may be a numeric number, a bit value, or other information, which is not limited in the disclosure.

Exemplarily, the first indication information may indicate that the type information of the first parameter and the type information of the second parameter include both one type. For example, the type information of the first parameter instructs the terminal to determine the channel quality of the cell, and the type information of the second parameter instructs the terminal to determine the location information.

Exemplarily, the first indication information may indicate that the type information of the first parameter includes one type and that the type information of the second parameter includes two types. For example, the type information of the first parameter instructs the terminal to determine the channel quality of the cell, and the type information of the second parameter instructs the terminal to determine the location information and determine the type of the satellite covering the communication range of the cell.

Exemplarily, the first indication information may indicate that the type information of the first parameter includes two types and that the type information of the second parameter includes one type. For example, the type information of the first parameter instructs the terminal to determine the channel quality of the cell and determine the location information, and the type information of the second parameter instructs the terminal to determine the type of the satellite covering the communication range of the cell.

Optionally, the trigger condition for the network device to transmit the first indication information to the terminal may include that: the terminal transmits indication information to the network device when the terminal needs to perform cell selection, and the indication information instructs the network device to transmit the first indication information to the terminal; or, the network device periodically transmits the first indication information to the terminal, or the like, which is not limited in the embodiments of the disclosure. For example, when starting cell selection, the terminal may transmit indication information to the network device, and the indication information instructs the network device to transmit the first indication information to the terminal. For another example, the network device may transmit the first indication information to the terminal at a preset time interval.

At 402, the terminal determines the first parameter and the second parameter of each of a plurality of first candidate cells based on the first indication information.

Herein, the plurality of first candidate cells may be neighbor cells of the current serving cell of the terminal. The first candidate cells may also be determined according to the type information of the second parameter in the first indication information, or the like, which is not limited in the disclosure.

Exemplarily, description is made below by taking an example that the type information of the second parameter corresponds to the channel quality of the cell.

For example, in one possible implementation, the terminal may determine the first candidate cells based on an S criterion. Optionally, the terminal may calculate an Srxlev value and Squal value of at least one neighbor cell based on the S criterion, and may determine the corresponding cells with the Srxlev value greater than 0 and the Squal value greater than 0 as the first candidate cells.

For another example, in one possible implementation, the terminal may determine the first candidate cells based on an R criterion. Optionally, the terminal may calculate a Rn value of at least one neighbor cell based on the R criterion, and determine the corresponding cells with the Rn value within a rangeToBestCell (the best cell range) as the first candidate cells. Optionally, the terminal may calculate a Rn value of at least one neighbor cell and a Rs value of the current serving cell of the terminal based on the R criterion, and determine the corresponding cells with the Rn value greater than the Rs value as the first candidate cells.

For another example, in one possible implementation, the terminal may determine the first candidate cells based on the S criterion and the R criterion. Optionally, the terminal may calculate an Srxlev value and Squal value of at least one neighbor cell based on the S criterion, and select the corresponding cells with the Srxlev value greater than 0 and the Squal value greater than 0, then calculate Rn values corresponding to the selected cells based on the R criterion, and take the corresponding cells with the Rn value within the rangeToBestCell (the best cell range) as the first candidate cells. Optionally, the terminal may calculate an Srxlev value and Squal value of at least one neighbor cell based on the S criterion, and select the corresponding cells with the Srxlev value greater than 0 and the Squal value greater than 0, then calculate Rn values corresponding to the selected cells and a Rs value of the current serving cell of the terminal based on the R criterion, and determine the cells with the Rn value greater than the Rs value as the first candidate cells.

In some feasible implementations, the terminal may receive the first indication information transmitted by the network device, and after receiving the first indication information, the terminal may determine the first parameter and the second parameter of each first candidate cell based on the first indication information.

In some feasible implementations, the terminal may receive the first system message including the first indication information transmitted by the network device. After receiving the first system message, the terminal may determine the first parameter and the second parameter of each first candidate cell based on the first indication information included in the first system message.

Exemplarily, the type information of the first parameter and the type information of the second parameter which are indicated by the first indication information received by the terminal are the channel quality of the cell and the location information of the terminal, respectively. After receiving the first indication information, the terminal may determine, for each first candidate cell, the channel quality of the cell and the location information of the terminal. Specifically, the type information of the first parameter and the type information of the second parameter are the channel quality of the cell and the location information of the terminal, respectively, in this case, the first parameter determined by the terminal based on the indication, that is, the channel quality of the first candidate cell, is S0, and the second parameter determined by the terminal based on the indication, that is, the location information of the terminal (the distance between the terminal and the center of the first candidate cell), is D0.

In some feasible implementations, in the case that the first indication information may indicate that the type information of the first parameter includes one or more types and the type information of the second parameter includes one or more types, the terminal may determine the first parameter and the second parameter of each first candidate cell based on the first indication information. Herein, the first parameter may include one or more types of parameters and the second parameter may include one or more types of parameters.

Exemplarily, the type information of the first parameter instructs the terminal to determine the channel quality of the cell and the location information, and the type information of the second parameter instructs the terminal to determine the type of the satellite covering the communication range of the cell. In this case, the first parameter includes the channel quality of the first candidate cell and the location information of the terminal, and the second parameter includes the type of the satellite covering the communication range of the first candidate cell. Specifically, the type information of the first parameter is the channel quality of the cell and the location information of the terminal, and the type information of the second parameter is the type of the satellite covering the communication range of the cell. In this case, the first parameter determined by the terminal based on the indication, that is, the channel quality of the first candidate cell is S0, and the location information of the terminal (the distance between the terminal and the center of the first candidate cell) is D0; and the second parameter determined by the terminal based on the indication, that is, the type of the satellite covering the communication range of the first candidate cell, is LEO.

Exemplarily, the type information of the first parameter instructs the terminal to determine the channel quality of the cell, and the type information of the second parameter instructs the terminal to determine the location information and determine the type of the satellite covering the communication range of the cell. In this case, the first parameter includes the channel quality of the first candidate cell, and the second parameter includes the location information of the terminal and the type of the satellite covering the communication range of the first candidate cell. Specifically, the type information of the first parameter is the channel quality of the cell, and the type information of the second parameter is the location information of the terminal and the type of the satellite covering the communication range of the cell. In this case, the first parameter determined by the terminal based on the indication, that is, the channel quality of the first candidate cell, is S0; and the second parameter determined by the terminal based on the indication, that is, the location information of the terminal (the distance between the terminal and the center of the first candidate cell) is D0, and the type of the satellite covering the communication range of the first candidate cell is LEO.

In some feasible implementations, the terminal may first determine a second parameter of each second candidate cell among a plurality of second candidate cells based on the first indication information; and determine the plurality of first candidate cells based on a parameter threshold and second parameters of the plurality of second candidate cells. After the terminal determines the first candidate cells, for each first candidate cell in the plurality of first candidate cells, the terminal may determine the first parameter of the first candidate cell based on the first indication information. Herein, the plurality of first candidate cells are part or all of the plurality of second candidate cells. Optionally, the second candidate cell, the second parameter of which is greater than the parameter threshold, may be determined as the first candidate cell. Or, determination may be performed in other manners, which is not limited in the disclosure.

Optionally, the parameter threshold may be pre-configured, such as specified by a communication protocol. The parameter threshold may also be obtained by receiving a message including the parameter threshold from the network device.

Herein, the specific implementation of obtaining the parameter threshold by receiving the message including the parameter threshold from the network device may include as follows. The network device transmits third indication information to the terminal. Herein, the third indication information indicates the parameter threshold. The terminal may receive the third indication information transmitted by the network device. After receiving the third indication information, the terminal may determine the plurality of first candidate cells based on the parameter threshold indicated by the third indication information and the second parameters of the plurality of second candidate cells. Optionally, the network device transmits a third system message to the terminal. Herein, the third system message includes the third indication information. The terminal may receive the third system message including the third indication information transmitted by the network device. After receiving the third system message, the terminal may determine the plurality of first candidate cells based on the third indication information included in the third system message. Optionally, the third indication information may be a numeric number, a bit value (bit), or other indication information, which is not limited in the disclosure.

Exemplarily, it is assumed that there are five second candidate cells, which are represented as a cell 1, a cell 2, a cell 3, a cell 4 and a cell 5, respectively. The second parameters corresponding to the cell 1, the cell 2, the cell 3, the cell 4 and the cell 5 are the channel quality of the cells, which are S1, S2, S3, S4 and S5, respectively. Optionally, the parameter threshold may be a rangeToBestCell. The second candidate cell, the channel quality of which is within the rangeToBestCell, is determined as the first candidate cell. Optionally, the parameter threshold may be S, the terminal may compare the channel quality of the second candidate cell with S, and the terminal determines the second candidate cell corresponding to the channel quality greater than S as the first candidate cell. If S1>S2>S3>S4>S5, and S3>S>S4, it is to be seen that the second parameters greater than the parameter threshold S are S1, S2 and S3. After determining that the second parameters greater than the parameter threshold S are S1, S2 and S3, the terminal may determine the second candidate cells corresponding to the second parameters S1, S2 and S3 as the first candidate cells.

In some feasible implementations, it is considered that the first indication information may be pre-configured, such as specified by a communication protocol. The terminal may pre-specify whether the first indication information used is the pre-configured first indication information or the first indication information received from the network device. For example, if the current communication environment of the terminal is poor (such as the value of a communication quality parameter is less than a corresponding threshold, or the communication environment is determined to be poor in other manners), it may be considered to directly obtain the first indication information from the pre-configuration. For another example, if the first indication information is pre-configured and the terminal receives the first indication information indicated by the network device, the terminal may use the first indication information indicated by the network device to determine the first parameter and the second parameter based on the first indication information indicated by the network device. For another example, if the first indication information is pre-configured, but the terminal receives the first indication information from the network device within a preset time range, the terminal may use the first indication information transmitted by the network device, otherwise, the terminal may use the pre-configured first indication information. For another example, if the first indication information is pre-configured, but the first indication information indicated by the network device and received by the terminal also carries time information, the time information indicates an effective time of the first indication information, the terminal may use the first indication information indicated by the network device within the effective time, and use the pre-configured first indication information for the rest of the time. Other regulations are also possible, which are not limited in the disclosure.

At 403, for each first candidate cell in the plurality of first candidate cells, the terminal determines a weight of the first candidate cell based on the first parameter of the first candidate cell.

In some feasible implementations, for each first candidate cell, the terminal may determine the weight of the first candidate cell according to correlation conversion of the first parameter of the first candidate cell. Optionally, the first parameter may include one or more types of parameters.

Exemplarily, it is assumed that the first parameter is the location information of the terminal. Herein, the location information of the terminal is determined based on the distance between the terminal and the reference point (cell center). For each first candidate cell, the specific implementation of determining the weight of the first candidate cell by the terminal may include as follows. The terminal determines the weight based on the distance between the terminal and the reference point (the center of the first candidate cell) and a radius of the first candidate cell. For example, the radius r of the first candidate cell is divided by the distance d between the terminal and the center of the first candidate cell, so that the weight may be r/d, or $(r/d)^2$, or $(r/d)^4$, or the like.

In some feasible implementations, for each first candidate cell, the terminal may determine the weight of the first candidate cell based on the first parameter of the first candidate cell and correspondences between first parameters and weights. Optionally, the correspondences may be pre-configured, such as specified by a communication protocol. Optionally, the correspondences may be obtained by receiving a message including the correspondences from the network device.

Optionally, the specific implementation of obtaining the correspondences by receiving the message including the corresponding information from the network device may include as follows. The network device transmits second indication information to the terminal. Herein, the second indication information indicates the correspondences between the first parameters and the weights. The terminal may receive the second indication information transmitted by the network device. After receiving the second indication information, for each first candidate cell, the terminal may determine the weight of the first candidate cell based on the correspondences between the first parameters and the weights indicated by the second indication information and the first parameter of the first candidate cell. Optionally, the network device transmits a second system message to the terminal. Herein, the second system message includes the second indication information. The terminal may receive the second system message including the second indication information transmitted by the network device. After receiving the second system message, the terminal may determine the weight of each first candidate cell based on the second indication information included in the second system message. Optionally, the second indication information may be a numeric number, a bit value (bit), or other indication information, which is not limited in the disclosure.

In some feasible implementations, considering that the first parameter may include one or more types of parameters, for each first candidate cell, the specific implementation of determining the weight of the first candidate cell by the terminal based on the first parameter of the first candidate cell may include the following different aspects.

For example, in the case that the first parameter includes one type of parameter, it is assumed that the first parameter is the location information of the terminal. Herein, the location information of the terminal is determined based on the distance between the terminal and the reference point (cell center). The specific implementation mode of determining the weight of the first candidate cell by the terminal may include as follows. The terminal determines the weight based on the distance between the terminal and the center of the first candidate cell and the radius of the first candidate cell. Or, the terminal determines the weight of the first candidate cell based on the correspondence between the distance from the terminal to the center of the first candidate cell and the weight.

For another example, in the case that the first parameter includes a plurality of types of parameters, it is assumed that the first parameter includes the channel quality of the first candidate cell and the location information of the terminal. Herein, the location information of the terminal is determined based on the distance between the terminal and the reference point (cell center). Optionally, the specific implementation mode of determining the weight of the first candidate cell by the terminal may include as follows. The terminal may first determine a first weight of the first candidate cell based on the correspondence between the channel quality of the cell and the weight, and then multiply the first weight by the distance between the terminal and the center of the first candidate cell, and take a multiplication result as the weight of the first candidate cell. Or, the terminal may determine a first weight of the first candidate cell based on the correspondence between the channel quality of the cell and the weight, determine a second weight of the first candidate cell based on the correspondence between the distance from the terminal to the center of the first candidate cell and the weight, and then multiply the first weight by the second weight, and take a multiplication result as the weight of the first candidate cell.

It is to be noted that the first system message, the second system message and the third system message described above may be the same system message or may be different system messages, which are not limited in the disclosure.

It is to be noted that the first indication information, the second indication information and the third indication information described above may be the same indication information or may be different indication information, which are not limited in the disclosure.

At 404, for each first candidate cell, the terminal determines a priority of the first candidate cell based on the second parameter of the first candidate cell and the weight of the first candidate cell.

In some feasible implementations, in the case that the first indication information indicates that the type information of the first parameter includes one or more types and the type information of the second parameter includes one or more types, the terminal may determine the first parameter and the second parameter of each first candidate cell based on the first indication information. Herein, the first parameter may include one or more types of parameters and the second parameter may include one or more types of parameters. Then, for each first candidate cell, the terminal may determine the priority of the first candidate cell based on the one or more types of parameters in the second parameter of the first candidate cell and the weight of the first candidate cell.

Exemplarily, in the case that the first parameter includes the plurality of types of parameters and the second parameter includes one type of parameter, it is assumed that the first parameter includes the channel quality of the first candidate cell and the location information of the terminal and that the second parameter includes the number of beams meeting the preset threshold in the cell. Herein, the location information of the terminal is determined based on the distance between the terminal and the reference point (cell center). Then, the specific implementation of determining, for each first candidate cell, the priority of the first candidate cell may include as follows. For each first candidate cell, the weight of the first candidate cell may be determined according to the description in the operation 403 above when the first parameter includes the plurality of types of parameters, and then the weight of the first candidate cell is multiplied by the number of beams meeting the preset threshold in the first candidate cell; and multiplication results for the plurality of first candidate cells are sorted in size, so that the terminal may determine the priority of each first candidate cell based on the size relationship. Optionally, the greater the multiplication result is, the higher the priority of the first candidate cell is.

Exemplarily, in the case that the first parameter includes one type of parameter and the second parameter includes the plurality of types of parameters, it is assumed that the first parameter includes the channel quality of the first candidate cell and that the second parameter includes the location information of the terminal and the number of beams meeting the preset threshold in the cell. Herein, the location information of the terminal is determined based on the distance between the terminal and the reference point (cell center). Then, the specific implementation of determining, for each first candidate cell, the priority of the first candidate cell may include as follows. For each first candidate cell, the terminal may determine the weight of the first candidate cell based on the correspondence between the channel quality of the cell and the weight, and multiply the weight by the distance from the reference point (the center of the first candidate cell) and by the number of beams meeting the preset threshold in the first candidate cell; and sort multiplication results for the plurality of first candidate cells in size, so that the terminal may determine the priority of each first candidate cell based on the size relationship. Optionally, the greater the multiplication result is, the higher the priority of the first candidate cell is.

At 405, the terminal determines a target cell based on priorities of the plurality of first candidate cells.

Herein, for the specific implementation of the operation 405, the reference may be made to the related description of the operation 303 in the above method for cell selection, which is not elaborated here.

In the embodiment of the disclosure, the network device may transmit the first indication information to the terminal. Herein, the first indication information indicates the type information of the first parameter and the type information of the second parameter, and the first parameter and the second parameter are configured for the terminal to perform cell selection. Then, the terminal may determine the first parameter and the second parameter of each of first candidate cells based on the first indication information. Further, for each first candidate cell in the plurality of first candidate cells, the terminal may determine the weight of the first candidate cell based on the first parameter of the first candidate cell, and determine the priority of the first candidate cell based on the second parameter of the first candidate cell and the weight of the first candidate cell; and then determine the target cell based on the priorities of the plurality of first candidate cells. In this way, the terminal screens the candidate cells based on the type information of various parameters provided by the network device, so that the terminal accesses the optimal cell, thus ensuring the reliability of cell selection by the terminal and avoiding the ping-pong effect.

Figure 5:
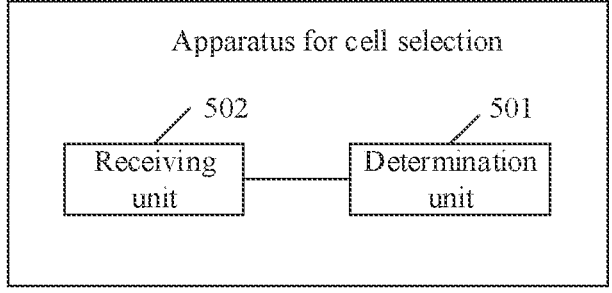
FIG. 5 is a structural diagram of an apparatus for cell selection according to an embodiment of the disclosure.

Referring to FIG. 5, FIG. 5 is a structural diagram of an apparatus for cell selection according to an embodiment of the disclosure. The apparatus is applied to a terminal and includes a determination unit 501.

The determination unit 501 is configured for a terminal to: for each first candidate cell in a plurality of first candidate cells, determine a weight of the first candidate cell based on a first parameter of the first candidate cell, and determine a priority of the first candidate cell based on a second parameter of the first candidate cell and the weight of the first candidate cell.

The determination unit 501 is further configured for the terminal to determine a target cell based on priorities of the plurality of first candidate cells.

In some feasible implementations, the determination unit 501 is further configured for the terminal to: for each first candidate cell, determine the first parameter and the second parameter of the first candidate cell based on first indication information. Herein, the first indication information indicates type information of the first parameter and type information of the second parameter.

In some feasible implementations, the first parameter or the second parameter includes at least one of: cell channel quality, terminal location information, a satellite type, a satellite deployment scenario, a cell type, or a number of beams meeting a preset threshold in the cell.

In some feasible implementations, the apparatus further includes a receiving unit 502, configured for the terminal to receive the first indication information transmitted by a network device.

In some feasible implementations, the receiving unit 502 is configured for the terminal to receive a first system message transmitted by the network device. Herein, the first system message includes the first indication information.

In some feasible implementations, the determination unit 501 is configured for the terminal to determine the weight of the first candidate cell based on the first parameter and correspondences between first parameters and weights.

In some feasible implementations, the receiving unit 502 is further configured for the terminal to receive second indication information transmitted by the network device. Herein, the second indication information indicates the correspondences between the first parameters and the weights.

In some feasible implementations, the receiving unit 502 is configured for the terminal to receive a second system message transmitted by the network device. Herein, the second system message includes the second indication information.

In some feasible implementations, the determination unit 501 is configured for the terminal to: determine a second parameter of each second candidate cell in a plurality of second candidate cells based on the first indication information; determine the plurality of first candidate cells based on a parameter threshold and second parameters of the plurality of second candidate cells, herein, the plurality of first candidate cells are part or all of the plurality of second candidate cells; and determine the first parameter of each first candidate cell in the plurality of first candidate cells based on the first indication information.

In some feasible implementations, the receiving unit 502 is further configured for the terminal to receive third indication information transmitted by the network device. Herein, the third indication information indicates the parameter threshold.

In some feasible implementations, the receiving unit 502 is configured for the terminal to receive a third system message transmitted by the network device. Herein, the third system message includes the third indication information.

It is to be understood that division of units in the embodiment of the disclosure is schematic and is only logic function division, and other division manners may be adopted during practical implementation. Various function units in the embodiment of the disclosure may be integrated into a processing unit, or each unit may exist independently, or two or more than two units may be integrated into a unit. The integrated unit may be implemented in form of hardware or may be implemented in form of software functional unit.

Figure 6:
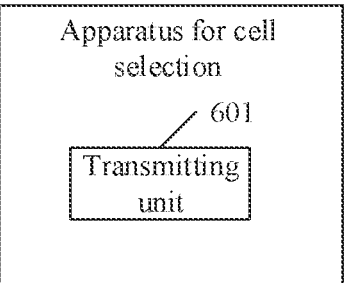
FIG. 6 is a structural diagram of another apparatus for cell selection according to an embodiment of the disclosure.

Referring to FIG. 6, FIG. 6 is a structural diagram of an apparatus for cell selection according to an embodiment of the disclosure. The apparatus is applied to a network device and includes a transmitting unit 601.

The transmitting unit 601 is configured for the network device to transmit first indication information to a terminal. Herein, the first indication information indicates type information of a first parameter and type information of a second parameter, and the first parameter and the second parameter are configured for cell selection.

In some feasible implementations, the first parameter or the second parameter includes at least one of: cell channel quality, terminal location information, a satellite type, a satellite deployment scenario, a cell type, or a number of beams meeting a preset threshold in a cell.

In some feasible implementations, the transmitting unit 601 is configured for the network device to transmit a first system message to the terminal. Herein, the first system message includes the first indication information.

In some feasible implementations, the transmitting unit 601 is further configured for the network device to transmit second indication information to the terminal. Herein, the second indication information indicates correspondences between first parameters and weights.

In some feasible implementations, the transmitting unit 601 is configured for the network device to transmit a second system message to the terminal. Herein, the second system message includes the second indication information.

In some feasible implementations, the transmitting unit 601 is further configured for the network device to transmit third indication information to the terminal. Herein, the third indication information indicates a parameter threshold.

In some feasible implementations, the transmitting unit 601 is configured for the network device to transmit a third system message to the terminal. Herein, the third system message includes the third indication information.

It is to be understood that division of units in the embodiment of the disclosure is schematic and is only logic function division, and other division manners may be adopted during practical implementation. Various function units in the embodiment of the disclosure may be integrated into a processing unit, or each unit may exist independently, or two or more than two units may be integrated into a unit. The integrated unit may be implemented in form of hardware form or may be implemented in form of software functional unit.

Figure 7:
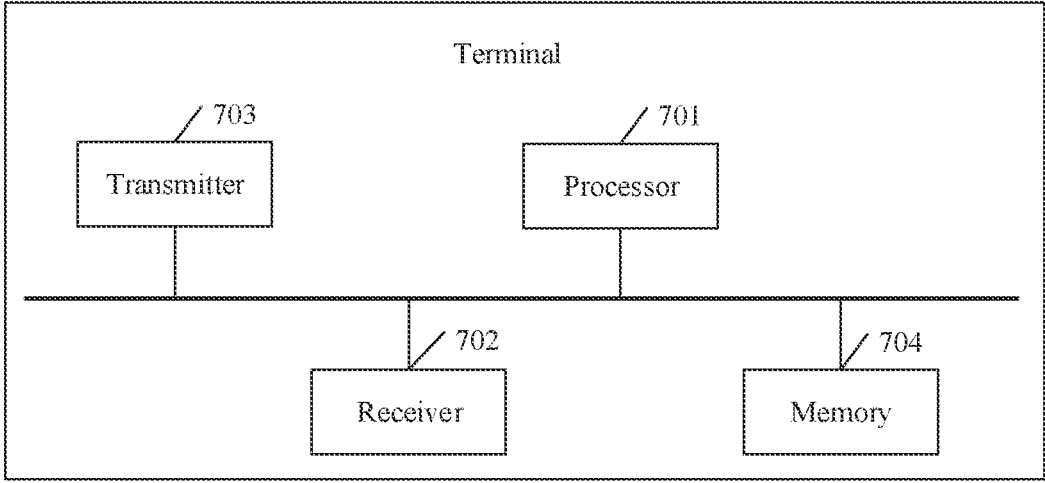
FIG. 7 is a structural diagram of a terminal according to an embodiment of the disclosure.

Referring to FIG. 7, FIG. 7 is a structural diagram of a terminal according to an embodiment of the disclosure. Herein, the terminal shown in FIG. 7 may include: a processor 701, a receiver 702, a transmitter 703 and a memory 704. The processor 701, the receiver 702, the transmitter 703 and the memory 704 are connected to a bus. Herein, the memory 704 is configured to store a computer program, and the computer program includes a program instruction. The processor 701 is configured to execute the program instruction stored in the memory 704.

In the embodiment of the disclosure, the processor 701 is configured to run an executable program code in the memory 704 to perform the following operations.

For each first candidate cell in a plurality of first candidate cells, a terminal determines a weight of the first candidate cell based on a first parameter of the first candidate cell, and determines a priority of the first candidate cell based on a second parameter of the first candidate cell and the weight of the first candidate cell.

The terminal determines a target cell based on priorities of the plurality of first candidate cells.

In some feasible implementations, the processor 701 is further configured for the terminal to determine the first parameter and the second parameter of the first candidate cell based on first indication information. Herein, the first indication information indicates type information of the first parameter and type information of the second parameter.

In some feasible implementations, the first parameter or the second parameter includes at least one of: cell channel quality, terminal location information, a satellite type, a satellite deployment scenario, a cell type, or a number of beams meeting a preset threshold in the cell.

In some feasible implementations, the processor 701 is further configured for the terminal to receive the first indication information transmitted by a network device.

In some feasible implementations, the processor 701 is configured for the terminal to receive a first system message transmitted by the network device. Herein, the first system message includes the first indication information.

In some feasible implementations, the processor 701 is configured for the terminal to determine the weight of the first candidate cell based on the first parameter and correspondences between first parameters and weights.

In some feasible implementations, the processor 701 is further configured for the terminal to receive second indication information transmitted by the network device. Herein, the second indication information is configured to indicate the correspondences between the first parameters and the weights.

In some feasible implementations, the processor 701 is configured for the terminal to receive a second system message transmitted by the network device. Herein, the second system message includes the second indication information.

In some feasible implementations, the processor 701 is configured for the terminal to: determine a second parameter of each second candidate cell in a plurality of second candidate cells based on the first indication information; determine the plurality of first candidate cells based on a parameter threshold and second parameters of the plurality of second candidate cells, herein, the plurality of first candidate cells are part or all of the plurality of second candidate cells; and determine the first parameter of each first candidate cell in the plurality of first candidate cells based on the first indication information.

In some feasible implementations, the processor 701 is further configured for the terminal to receive third indication information transmitted by the network device. Herein, the third indication information indicates the parameter threshold.

In some feasible implementations, the processor 701 is configured for the terminal to receive a third system message transmitted by the network device. Herein, the third system message includes the third indication information.

Figure 8:
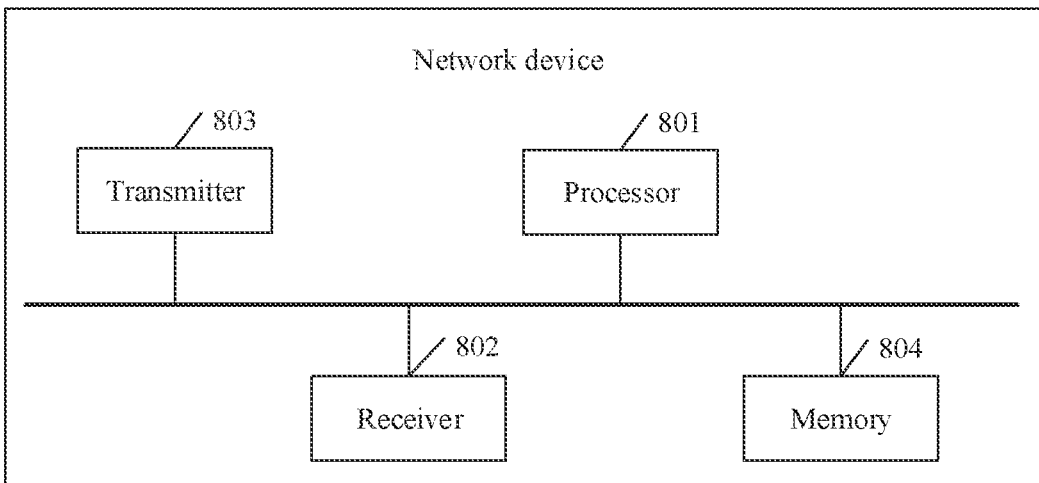
FIG. 8 is a structural diagram of a network device according to an embodiment of the disclosure.

Referring to FIG. 8, FIG. 8 is a structural diagram of a network device according to an embodiment of the disclosure. Herein, the network device shown in FIG. 8 may include: a processor 801, a receiver 802, a transmitter 803, and a memory 804. The processor 801, the receiver 802, the transmitter 803, and the memory 804 are connected to a bus. Herein, the memory 804 is configured to store a computer program, and the computer program includes a program instruction. The processor 801 is configured to execute the program instruction stored in the memory 804.

In the embodiment of the disclosure, the processor 801 is configured to run an executable program code in the memory 804 to perform the following operations.

The network device transmits first indication information to a terminal. Herein, the first indication information indicates type information of a first parameter and type information of a second parameter, and the first parameter and the second parameter are configured for cell selection.

In some feasible implementations, the first parameter or the second parameter includes at least one of: cell channel quality, terminal location information, a satellite type, a satellite deployment scenario, a cell type, or a number of beams meeting a preset threshold in a cell.

In some feasible implementations, the processor 801 is configured for the network device to transmit a first system message to the terminal. Herein, the first system message includes the first indication information.

In some feasible implementations, the processor 801 is further configured for the network device to transmit second indication information to the terminal. Herein, the second indication information indicates correspondences between first parameters and weights.

In some feasible implementations, the processor 801 is configured for the network device to transmit a second system message to the terminal. Herein, the second system message includes the second indication information.

In some feasible implementations, the processor 801 is further configured for the network device to transmit third indication information to the terminal. Herein, the third indication information indicates a parameter threshold.

In some feasible implementations, the processor 801 is configured for the network device to transmit a third system message to the terminal. Herein, the third system message includes the third indication information.

The embodiment of the disclosure further provides a computer storage medium. The computer storage medium has stored thereon a program instruction that, when executed, performs part or all of the operations of the method for cell selection in the embodiment as shown in FIG. 3 or FIG. 4.

The embodiment of the disclosure further provides a computer program product. The computer program product includes a non-transitory computer readable storage medium storing a computer program. The computer program is operable to cause a computer to perform part or all of the operations described by the terminal or the network device in the above method embodiments. The computer program product may be a software package.

The operations of the methods or algorithms described with reference to the specification of the disclosure may be implemented in form of hardware or may be implemented by a processor executing a software instruction. The software instructions may be composed of corresponding software modules, and the software modules may be stored in a Random Access Memory (RAM), a flash memory, a Read Only Memory (ROM), an Erasable Programmable ROM (EPROM), an Electrically EPROM (EEPROM), a register, a hard disk, a removable hard disk, a CD-ROM, or any other form of storage medium known in the art. An exemplary storage medium is coupled to the processor so that the processor may read information from and write information to the storage medium. Of course, the storage medium may also be a component of the processor. The processor and the storage medium may be located in an Application Specific Integrated Circuit (ASIC). In addition, the ASIC may be located in an apparatus for cell selection, such as a terminal. Of course, the processor and the storage medium may also serve as discrete components and exist in the apparatus for cell selection.

It is to be understood that the first, second, and various numeral numbers involved herein are distinguished only for convenience of description, and are not intended to limit the scope of the embodiments of the disclosure.

It is to be understood that the size of sequence numbers of the foregoing processes do not mean the order of execution in various embodiments of the present disclosure. The order of execution of the processes should be determined according to functions and internal logic of the processes, and should not be construed as any limitation to the implementation processes of the embodiments of the present disclosure.

Those of ordinary skill in the art should understand that implementation of all or part of the processes in the above method embodiments may be completed by instructing related hardware through a computer program, and the program may be stored in a computer-readable storage medium. The program, when executed, may include the processes of the above method embodiments. The above-mentioned storage medium includes: various media capable of storing program codes, such as a ROM, a RAM, a magnetic disk or an optical disc.

The invention claimed is:

1. A method for cell selection, comprising:
for each first candidate cell in a plurality of first candidate cells,
determining, by a terminal, a weight of the first candidate cell based on a first parameter of the first candidate cell, and
determining, by the terminal, a priority of the first candidate cell based on a second parameter of the first candidate cell and the weight of the first candidate cell, wherein the first parameter is different from the second parameter; and
determining, by the terminal, a target cell based on priorities of the plurality of first candidate cells,
determining, by the terminal, the priority of the first candidate cell based on the second parameter of the first candidate cell and the weight of the first candidate cell comprises:
multiplying, by the terminal, the second parameter of the first candidate cell by the weight of the first candidate cell to obtain a multiplication result for the first candidate cell; and
determining, by the terminal, the priority of the first candidate cell based on the multiplication result for the first candidate cell,
wherein each of the first parameter and the second parameter comprises at least one of: terminal location information, a satellite type, a satellite deployment scenario, a cell type, and a number of beams meeting a preset threshold in the cell,
wherein at least one of the following applies:
the terminal location information comprises a distance between the terminal and a cell center of the first candidate cell or a distance between the terminal and a satellite,
the satellite type comprises a Geostationary Earth Orbit (GEO) satellite or a Low-Earth Orbit (LEO) satellite,
the satellite deployment scenario comprises a non-terrestrial communication network scenario based on transparent payload or a non-terrestrial communication network scenario based on regenerative payload, or
the cell type comprises a fixed cell or a moving cell.

2. The method of claim 1, further comprising:
determining, by the terminal, the first parameter and the second parameter of the first candidate cell based on first indication information, the first indication information indicating type information of the first parameter and type information of the second parameter.

3. The method of claim 2, wherein determining, by the terminal, the first parameter and the second parameter of the first candidate cell based on the first indication information comprises:

determining, by the terminal, a second parameter of each second candidate cell in a plurality of second candidate cells based on the first indication information;
determining, by the terminal, the plurality of first candidate cells based on a parameter threshold and second parameters of the plurality of second candidate cells, the plurality of first candidate cells being part or all of the plurality of second candidate cells; and
determining, by the terminal, the first parameter of each first candidate cell in the plurality of first candidate cells based on the first indication information.

4. The method of claim 3, further comprising:
receiving, by the terminal, third indication information transmitted by a network device, the third indication information indicating the parameter threshold.

5. The method of claim 4, wherein receiving, by the terminal, the third indication information transmitted by the network device comprises:
receiving, by the terminal, a third system message transmitted by the network device, wherein the third system message comprises the third indication information.

6. The method of claim 2, further comprising:
receiving, by the terminal, the first indication information transmitted by a network device.

7. The method of claim 6, wherein receiving, by the terminal, the first indication information transmitted by the network device comprises:
receiving, by the terminal, a first system message transmitted by the network device, wherein the first system message comprises the first indication information.

8. The method of claim 1, wherein determining, by the terminal, the weight of the first candidate cell based on the first parameter of the first candidate cell comprises:
determining, by the terminal, the weight of the first candidate cell based on the first parameter and correspondences between first parameters and weights.

9. The method of claim 8, further comprising:
receiving, by the terminal, second indication information transmitted by a network device, the second indication information indicating the correspondences between the first parameters and the weights.

10. The method of claim 9, wherein receiving, by the terminal, the second indication information transmitted by the network device comprises:
receiving, by the terminal, a second system message transmitted by the network device, wherein the second system message comprises the second indication information.

11. A terminal, comprising:
a processor; and
a memory, coupled with the processor and configured to store a computer program instruction that, when executed by the processor, causes the terminal to perform the following operations including:
for each first candidate cell in a plurality of first candidate cells,
determining a weight of the first candidate cell based on a first parameter of the first candidate cell in a plurality of first candidate cells, and
determining a priority of each first candidate cell based on a second parameter of each first candidate cell and the weight of each first candidate cell, wherein the first parameter is different from the second parameter; and
determining a target cell based on priorities of the plurality of first candidate cells, wherein the processor is configured to execute the computer program instruction to cause the terminal to multiply the second parameter of the first candidate cell by the weight of the first candidate cell to obtain a multiplication result for the first candidate cell; and determine the priority of the first candidate cell based on the multiplication result for the first candidate cell, wherein each of the first parameter and the second parameter comprises at least one of: terminal location information, a satellite type, a satellite deployment scenario, a cell type, and a number of beams meeting a preset threshold in the cell, wherein at least one of the following applies:

the terminal location information comprises a distance between the terminal and a cell center of the first candidate cell or a distance between the terminal and a satellite, the satellite type comprises a Geostationary Earth Orbit (GEO) satellite or a Low-Earth Orbit (LEO) satellite, the satellite deployment scenario comprises a non-terrestrial communication network scenario based on transparent payload or a non-terrestrial communication network scenario based on regenerative payload, or the cell type comprises a fixed cell or a moving cell.

12. The terminal of claim 11, wherein the processor is further configured to execute the compute program instruction to cause the terminal to determine the first parameter and the second parameter of the first candidate cell based on first indication information, the first indication information indicating type information of the first parameter and type information of the second parameter.

13. The terminal of claim 12, wherein the processor is configured to execute the compute program instruction to cause the terminal to:

determine a second parameter of each second candidate cell in a plurality of second candidate cells based on the first indication information;

determine the plurality of first candidate cells based on a parameter threshold and second parameters of the plurality of second candidate cells, the plurality of first candidate cells being part or all of the plurality of second candidate cells; and determine the first parameter of each first candidate cell in the plurality of first candidate cells based on the first indication information.

14. The terminal of claim 13, wherein the processor is configured to execute the compute program instruction to cause the terminal to receive third indication information transmitted by a network device, the third indication information indicating the parameter threshold.

15. The terminal of claim 14, wherein the processor is configured to execute the compute program instruction to cause the terminal to receive a third system message transmitted by the network device, wherein the third system message comprises the third indication information.

16. The terminal of claim 12, wherein the processor is configured to execute the compute program instruction to cause the terminal to receive the first indication information transmitted by a network device.

17. The terminal of claim 16, wherein the processor is configured to execute the compute program instruction to cause the terminal to receive a first system message transmitted by the network device, wherein the first system message comprises the first indication information.

18. The terminal of claim 11, wherein the processor is configured to execute the compute program instruction to cause the terminal to determine the weight of the first candidate cell based on the first parameter and correspondences between first parameters and weights.

19. The terminal of claim 18, wherein the processor is configured to execute the compute program instruction to cause the terminal to receive second indication information transmitted by a network device, the second indication information indicating the correspondences between the first parameters and the weights.

20. The terminal of claim 19, wherein the processor is configured to execute the compute program instruction to cause the terminal to receive a second system message transmitted by the network device, wherein the second system message comprises the second indication information.

* * * * *